United States Patent [19]

Wojcik

[11] Patent Number: 4,858,985
[45] Date of Patent: Aug. 22, 1989

[54] VEHICLE COVER PROTECTOR—"VCP"

[76] Inventor: Leszek Wojcik, 9/20 Crown Street, Granville, New South Wales, Australia

[21] Appl. No.: 179,500

[22] Filed: Apr. 8, 1988

[30] Foreign Application Priority Data

Apr. 8, 1987 [AU] Australia ............................ PI1325

[51] Int. Cl.$^4$ ............................................. B60J 11/00
[52] U.S. Cl. .................................... 296/136; 296/161
[58] Field of Search ............... 296/118, 136, 161, 163; 114/361; 135/88, 90, 95, DIG. 1, DIG. 5

[56] References Cited

U.S. PATENT DOCUMENTS 4,075,723  2/1978  Bareis et al. ..................... 114/361
4,657,298  4/1987  Yong O .............................. 296/136
4,720,135  1/1988  Farina ................................ 296/136

Primary Examiner—Joseph F. Peters, Jr.
Assistant Examiner—Jesûs D. Sotelo
Attorney, Agent, or Firm—McGlew & Tuttle

[57] ABSTRACT

A vehicle cover protector which protects most exposed parts of a motor vehicle from harsh climatic conditions including sun, rain, chemical fallout, pollution, dust, snow, sleet and hail. The cover is attached either within the vehicle or attached externally, mounted within a housing. A retractable cover covers the surface of the car. The cover may also be mounted over supporting members in order to provide additional protection from damage due to hail. The cover may be mounted upon two adjustable poles, which further provides for a sunshade available to persons or objects adjacent to the vehicle.

10 Claims, 3 Drawing Sheets

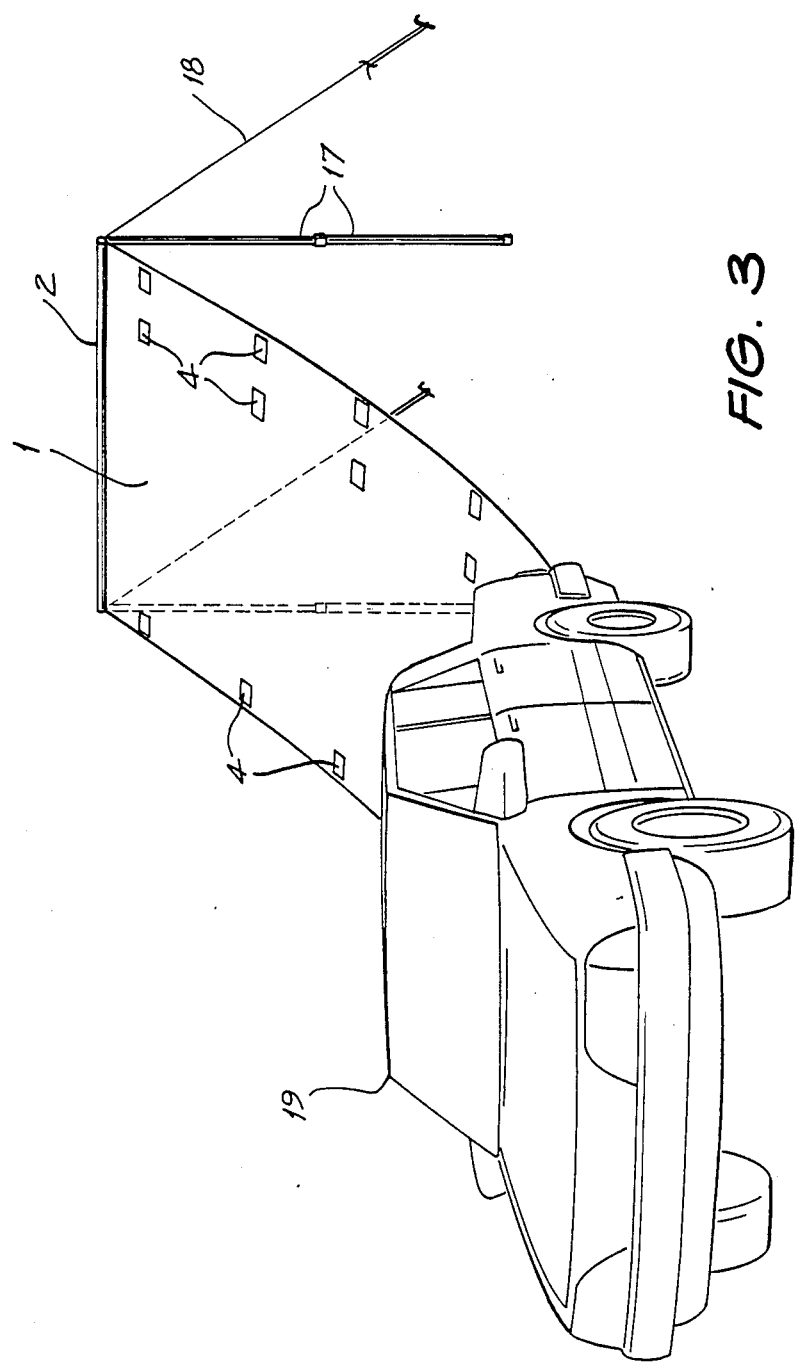

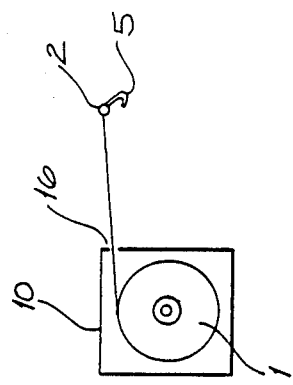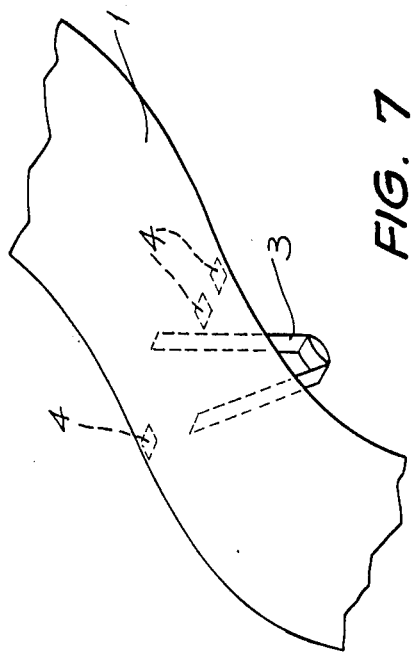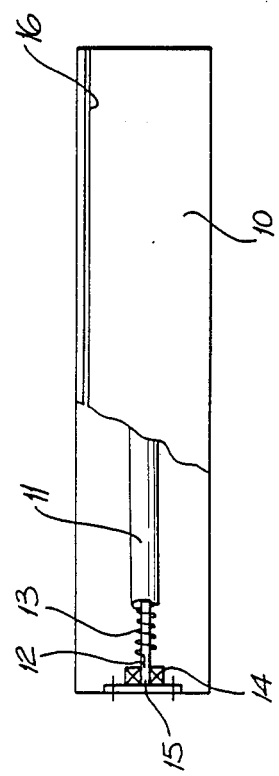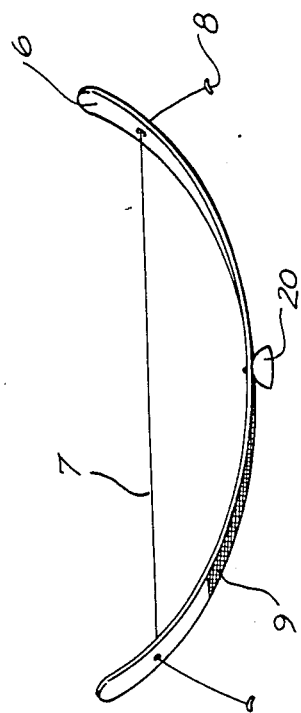

VEHICLE COVER PROTECTOR—"VCP"

FIELD AND BACKGROUND OF THE INVENTION

The present invention was conceived mainly because of the climactic conditions that cars and other objects are subject to in many countries. The invention relates to a non-rigid weather cover that protects the most exposed part of motor vehicles. This vehicle protection cover is comprised of one piece of rectangular material of suitable width, with long-lasting durable properties capable of reflecting a major part of the solar radiation incident upon it. It is stowed in a housing mounted on the exterior of the vehicle or within the vehicle and is deployed using the well known Holland blind principle.

SUMMARY OF THE INVENTION

The present invention provides three major types of protection: protection from solar radiation for vehicles; hail protection for vehicles; and sun protection for people or things extended away from the vehicle.

The protection from solar radiation is provided to most of the exterior of the vehicle by deploying the cover material over the vehicle from one end to the other. This mode of protection may also be used for protection from chemical fallout, pollution, dust, snow and sleet.

The second of the three modes of protection is to protect the majority of the vehicle's exterior by deploying the cover in combination with the supporting cross-members that are permanently or temporarily integrated into the covering material across the width of the material, and which engages in small pockets in the sides of the cover. In this mode of operation the cross members are bent so as to insure that an adequate distance is maintained between the cover and the surface of the vehicle so that hailstones will strike the surface of the cover. By virtue of the space between the cover and the surface of the vehicle, no hailstones will strike the vehicle nor will they exert sufficient force upon the cover to force the cover against the vehicle.

The third of the above-mentioned or objects from the sun. In this configuration, the vehicle cover is used in combination with two adjustable tubes which are attached to the terminal bar of the cover. This kind of sunshade can be erected without tubes by attaching the terminal bar to a tree or other object. When combined with additional sheets of material acting as side walls, this sunshade may be converted into a tent.

In practice, the cover is removed by pulling the terminal bar at the end of the cover which draws it off of the roller against a retraction force of a roller spring. The cover is drawn out through a slot in the housing and over the roof of the vehicle to the opposite bumper of the car at which point the terminal bar is locked into position. To stow the vehicle cover, the terminal bar is unlocked and the retracting force of the tensioning roller allows the cover to be drawn back through the slot into the housing, and stowing the cover onto the roller.

Accordingly, one object of the invention is to protect the most exposed parts of a vehicle from the heat of the sun. The use of suitable materials for the cover allows the vehicle cover protector to be effective in protecting a vehicle from snow, chemical fallout, dust and rain. The cover may be mounted within the paneling of the vehicle, within the body of the front or rear bumper, or under or above a bumper in a position which neither detracts from the appearance of the vehicle nor adds to the aerodynamic drag.

Another object of the invention is to provide a vehicle protection cover that may be rapidly deployed and reliable in operation.

Still another object of the invention is to protect the most exposed parts of the vehicle from damage due to hail. A further object of the invention is to provide a sunshade for people or objects.

Another object of the invention is to provide a vehicle cover protector which is simple in design, rugged in construction and economical to manufacture.

The various features of novelty which characterize the invention are pointed out with particularity in the claims next to and forming a part of this disclosure. For better understanding of the invention, its operating advantages, and specific objects attained by its uses, reference should be made to the accompanying drawings and descriptive matter in which preferred embodiments of the invention are illustrated.

BRIEF DESCRIPTION OF THE DRAWINGS

In the drawings:

FIG. 3 is a vehicle cover in a fully deployed position as sunshade.

FIG. 4 is a side elevational view of the winder mechanism housing.

FIG. 5 is a cross-sectional view of the housing of FIG. 4.

FIG. 6 is a supporting cross-member in its working position.

FIG. 7 is a bridle which connects the cross member of FIG. 6 to the cover of FIG. 1.

DESCRIPTION OF THE PREFERRED EMBODIMENT

Figure 1:
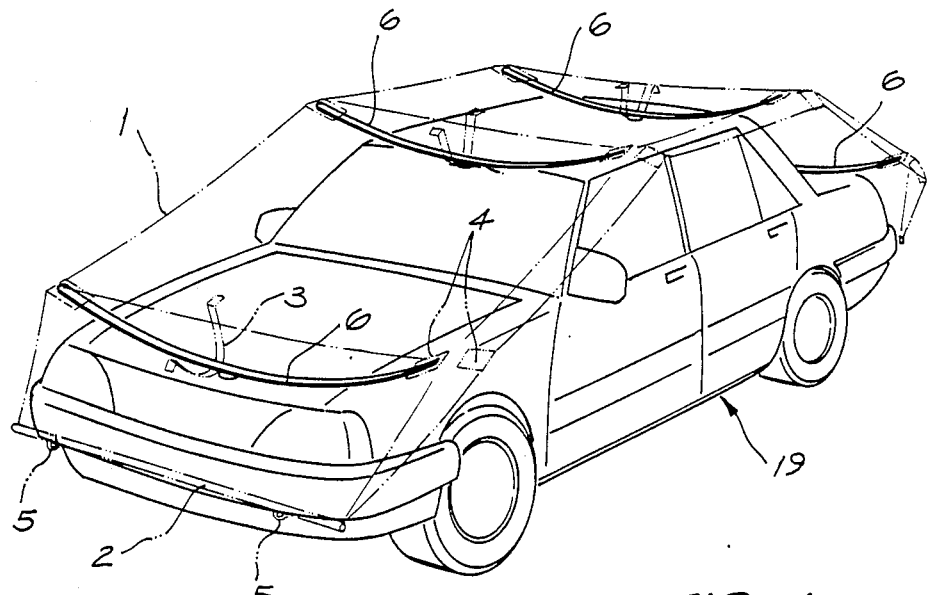
FIG. 1 is a perspective side elevational view of a vehicle cover mounted within a vehicle paneling, in accordance with the invention.
Figure 2:
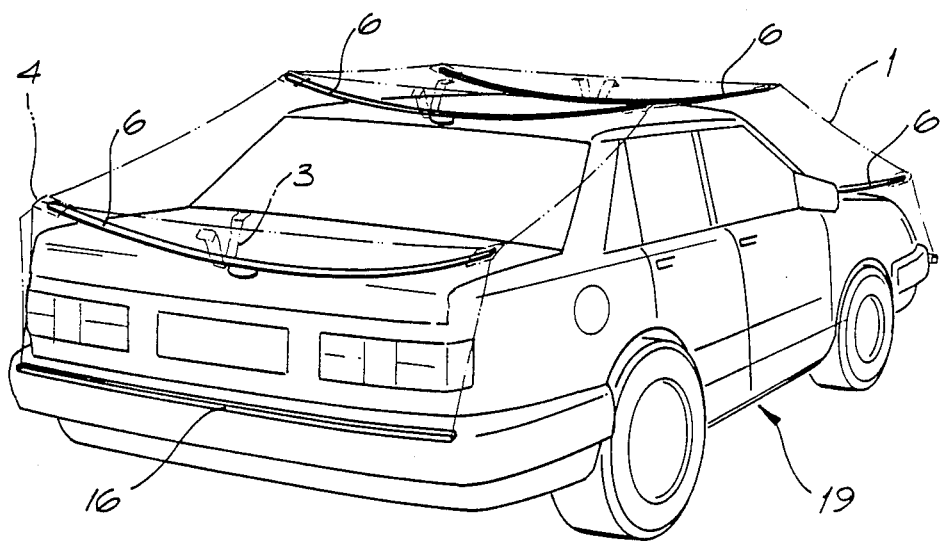
FIG. 2 is a perspective rear view of the arrangement shown in FIG. 1.

FIGS. 1 and 2 illustrate a vehicle over which a vehicle cover protector is erected. Cover retaining means 5 lock one end of the vehicle cover to the vehicle by fastening to a terminal bar 2, attached to the end of a vehicle cover means. The cover means is supported by a plurality of supporting members 6, 7, 8 & 9. The ends of the supporting members fit into pockets 4. The supporting members pass through a bridle 3 in the center of the cover means, keeping the supporting members in the correct position. The length of the supporting members is greater than the distance between the closest pockets, hence the supporting members bend, thus giving an adequate distance between the cover means 1 and the surface to be protected.

The cover means 1 is of a suitable width to provide full cover to those parts of the exterior of an automobile which should be protected from weather or sun. The material from which the cover means is made is of a suitable width and length to provide full cover to those parts of the exterior which are to be protected. The cover means may be made of one piece, either in a rectangular shape or of any suitable shape to cover the desired portions of a vehicle. In one embodiment of the invention, a reflective material with good hail resistance is most suitable. For localities where frequent snow and frost occur, a material that is resistant to those conditions would be best chosen. The cover may be made in various sizes to suit any model of vehicle. The cover means includes pockets 4 that are required for the fitting of supporting members 6, which in combination with the cover means protect the vehicle from hail damage. Both ends of the cover means 1 comprise suitable pockets 4 which keep supporting members 6, 7, 8 and 9 in bent positions if inserted in the closer pockets, or in straight position when an end of a supporting member is shifted to the outside pocket.

As shown in FIG. 3, the vehicle cover means may be deployed as a sunshade. To keep the vehicle cover means in the correct position, a terminal bar 2 is connected at each end to a tube of adjustable height, such as a telescopic tube 17. Such adjustable tubes comprise an end and an opposite end, with the end of said tube connected to the terminal bar 2 with the opposite end resting on the ground. Adjusting means such as cords 18 are adjustably attached to the terminal bar 2 in order to maintain adequate tension on the cover means 1.

As shown in FIG. 4, a housing 10 of any suitable cross-sectional shape accommodates a retracting or winder mechanism. The winder mechanism may be powered either electrically or by spring. The retracting or winding mechanism consists of a roller 11 which freely rotates on pins 15, both ends of which are carried in bearings 14, mounted on the sides of the housing 10.

In one embodiment, within the roller 11 is located a spring 13, having an end wit an opposite end attached to a guide bar 12, which together with spring 13 is rigidly connected to a pin 15, as illustrated in FIG. 4. The opposite end of the spring is fixed within the roller 11. This arrangement is designed to allow a retracting force to be applied to the vehicle cover and to be varied as required. On one face of the housing 10 is a slot which permits the egress and ingress of the cover means 1 as shown in FIG. 5. The slot is filled by a terminal bar 2 attached to the front of the cover means 1 when the cover means is in the retracted position. To deploy the cover means 1, tension is applied to the end of said cover means through the terminal bar 2 which draws the cover off of the roller 11 against the retracting force of the roller 11. To stow the cover means 1, the cover means is wound by retracting the cords onto the roller 11 through slot 16 into the housing 10 until the terminal bar 2 enters slot 16, the terminal bar being of greater diameter than the slot thereby preventing the bar from retracting inside the housing. The housing protects the cover means 1 when the cover means is not in use.

The vehicle cover protector may also be mounted within the bumper bar of a vehicle, in which case the housing is not required. The roller may be mounted in the bumper by use of any simple brackets.

The supporting members may be of any suitable cross-sectional area and length. The supporting members are made from any flexible material. The material passes through the bridle 3, the ends of which are prepared for location in pockets 4. A stiffener 7, having two ends is fixably connected onto member 6 at one end and the other end can be adjustably connected, thus allowing adjustment for the ends of supporting member 6 in pockets 4 when the supporting member is in the bent position, or released to allow the storage of the supporting member 6 in a flat position. On each end of the stiffener is attached a catch 8 which keeps the supporting member 6 and the fitted cover means 1 in the correct position during strong winds. In one embodiment of the invention, the catch may be positioned between the vehicle door and the vehicle chassis so that when the vehicle door is closed the catch will be fixed between the door and the chassis. To prevent scratching of the paintwork of the vehicle by the supporting members, a protector 9 which is made from a soft material or non-scratching material is affixed to the bottom surface of the supporting members, such as by gluing. The supporting members can be integrated into the cover means 1 or can be separate units. Another embodiment of the invention can utilize a means to fixably attach the supporting members to the vehicles's surface, using a fixing means which will not scratch or mar the vehicle's surface, and is removable, such as a suction cup 20.

FIG. 7 shows bridle 3 made from the same material as the cover means or any other suitable material that keeps the supporting members in the correct position. The bridle may be of any suitable length so as to allow connection of a full length tube as required across the cover to a pocket on one side of the cover, through which a supporting member may be inserted. The fixing means is sized so as to give an adequate sticking capacity without interfering with the retraction of the cover into its stowed position.

While specific embodiments of the invention have been shown and described in detail to illustrate the application of the principals of the invention, it will be understood that the invention may be embodied otherwise without departing from such principals.

What is claimed is:

1. A vehicle cover protector comprising: a cover adapted to be positioned over a vehicle; retractable roller means including a roller connected to said cover for storing said cover, said retractable roller means being connected to at least one end of the vehicle, with said cover being wound about said roller; and, cover supporting means with at least one supporting member adapted to support said cover when said cover is positioned above the surface of the vehicle, at least two retaining portions attached to said cover and spaced apart from each other a distance smaller than the length of said supporting member, said supporting member having ends insertable into said retaining portions so as to urge said supporting member into an arcuate shape, said vehicle engagement portion being positionable between said supporting member ends.

2. A vehicle cover protector according to claim 1 wherein said at least one supporting member includes three supporting members adapted to be positioned on a hood, roof and trunk of a vehicle respectively.

3. A vehicle cover protector, according to claim 1 wherein said at least one supporting member includes four supporting members adapted to be positioned on the hood, roof, and trunk of a vehicle.

4. A vehicle cover protector according to claim 1 wherein said at least one supporting member includes a plurality of support members, each adapted to be positioned on a vehicle.

5. A vehicle cover protector according to claim 1 wherein said at least one supporting member comprises: removable fixing means for fixably mounting said supporting member on the vehicle, said fixing means being attached to said supporting member.

6. A vehicle cover protector according to claim 1 wherein the supporting member comprises a fixing means which may be removed, said fixing means fixably attached to the vehicle and removably attached to said supporting member.

7. A vehicle cover protector according to claim 1, further comprising a connector for connecting the cover means with supporting members.

8. A vehicle cover protector according to claim 1, wherein said supporting members include a stiffener which is adjustably connected to said support members.

9. A vehicle cover protector according to claim 8, including a catch attached to said stiffener.

10. A vehicle cover protector according to claim 1, wherein said supporting member includes a soft material affixed to the bottom surface of said supporting members.

* * * * *